US011151255B2

United States Patent
Cho et al.

(10) Patent No.: US 11,151,255 B2
(45) Date of Patent: Oct. 19, 2021

(54) METHOD TO SECURELY ALLOW A CUSTOMER TO INSTALL AND BOOT THEIR OWN FIRMWARE, WITHOUT COMPROMISING SECURE BOOT

(71) Applicant: Dell Products L.P., Round Rock, TX (US)

(72) Inventors: Eugene David Cho, Austin, TX (US); Michael Emery Brown, Austin, TX (US); Marshal F. Savage, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 435 days.

(21) Appl. No.: 16/171,595

(22) Filed: Oct. 26, 2018

(65) Prior Publication Data

US 2020/0134185 A1 Apr. 30, 2020

(51) Int. Cl.
*G06F 21/00* (2013.01)
*G06F 21/57* (2013.01)
*G06F 21/60* (2013.01)

(52) U.S. Cl.
CPC .......... *G06F 21/572* (2013.01); *G06F 21/575* (2013.01); *G06F 21/602* (2013.01)

(58) Field of Classification Search
CPC ..... G06F 21/572; G06F 21/575; G06F 21/602
See application file for complete search history.

(56) References Cited

U.S. PATENT DOCUMENTS

| 4,567,600 | A | 1/1986 | Massey et al. |
| 4,587,627 | A | 5/1986 | Omura et al. |
| 5,854,759 | A | 12/1998 | Kaliski, Jr. et al. |
| 6,212,279 | B1 | 4/2001 | Reiter et al. |
| 6,243,467 | B1 | 6/2001 | Reiter et al. |
| 6,252,960 | B1 | 6/2001 | Seroussi |

(Continued)

FOREIGN PATENT DOCUMENTS

| CN | 104424068 A | * | 3/2015 | ........... G06F 21/577 |
| KR | 20130101555 A | * | 9/2013 | ........... G06F 3/0605 |
| WO | WO-2014091535 A1 | * | 6/2014 | ........... G06F 21/575 |

OTHER PUBLICATIONS

NPL Search (Year: 2021).*

(Continued)

*Primary Examiner* — John B King
(74) *Attorney, Agent, or Firm* — Baker Botts L.L.P.

(57) ABSTRACT

In one or more embodiments, one or more systems, methods, and/or process may allow a customer to install and boot their own firmware securely, without compromising secure boot. A baseboard management controller (BMC) may include a BMC firmware stored via a BMC partition of a non-volatile storage, a customer firmware image including a customer firmware and a signed customer boot block (CBB) file including a CBB, a hidden root key (HRK) hash of the CBB based on a HRK, and a manufacturer signature. The BMC firmware may, when an alternate path to boot the CBB is detected, verify the manufacturer signature on the CBB and the HRK hash, verify the HRK hash based on the unique HRK, and when the manufacturer signature and the HRK hash have been verified, hardware lock the BMC partition, disable the HRK, and transfer control to the CBB.

17 Claims, 4 Drawing Sheets

(56) References Cited

U.S. PATENT DOCUMENTS

| | | | |
|---|---|---|---|
| 6,563,928 B1 | 5/2003 | Vanstone et al. | |
| 6,782,100 B1 | 8/2004 | Vanstone et al. | |
| 7,257,814 B1* | 8/2007 | Melvin | G06F 9/3004 |
| | | | 710/200 |
| 8,560,823 B1* | 10/2013 | Aytek | G06F 8/654 |
| | | | 713/2 |
| 8,756,417 B1* | 6/2014 | Gardner | G06F 21/10 |
| | | | 713/164 |
| 8,874,922 B2* | 10/2014 | Jaber | G06F 21/572 |
| | | | 713/176 |
| 9,703,725 B2* | 7/2017 | Berke | G06F 12/1441 |
| 9,798,624 B2* | 10/2017 | Herzi | G06F 11/1435 |
| 10,735,190 B1* | 8/2020 | Khare | H04L 9/0897 |
| 10,938,855 B1* | 3/2021 | Waldie | G06F 9/44505 |
| 10,949,953 B2* | 3/2021 | Lin | G06T 3/4015 |
| 10,958,005 B1* | 3/2021 | Dube | H01R 12/737 |
| 2004/0268140 A1* | 12/2004 | Zimmer | G06F 21/575 |
| | | | 726/3 |
| 2007/0094508 A1* | 4/2007 | Palum | G06F 21/572 |
| | | | 713/176 |
| 2007/0169088 A1* | 7/2007 | Lambert | G06F 11/0793 |
| | | | 717/168 |
| 2007/0260866 A1* | 11/2007 | Wang | G06F 21/57 |
| | | | 713/2 |
| 2008/0005577 A1* | 1/2008 | Rager | H04W 12/106 |
| | | | 713/183 |
| 2008/0072071 A1* | 3/2008 | Forehand | G06F 21/602 |
| | | | 713/193 |
| 2008/0256363 A1* | 10/2008 | Balacheff | G06F 21/572 |
| | | | 713/187 |
| 2010/0257597 A1* | 10/2010 | Miyazaki | G06F 21/41 |
| | | | 726/8 |
| 2011/0113231 A1* | 5/2011 | Kaminsky | G06F 21/575 |
| | | | 713/2 |
| 2011/0179407 A1* | 7/2011 | Minegishi | G06F 8/65 |
| | | | 717/170 |
| 2013/0125107 A1* | 5/2013 | Bandakka | G06F 11/1448 |
| | | | 717/171 |
| 2014/0068238 A1* | 3/2014 | Jaber | H04L 63/061 |
| | | | 713/2 |
| 2014/0298317 A1* | 10/2014 | Devine | G06F 9/50 |
| | | | 717/174 |
| 2014/0365755 A1* | 12/2014 | Liu | G06F 21/572 |
| | | | 713/2 |
| 2015/0058979 A1* | 2/2015 | Peeters | G06F 21/575 |
| | | | 726/22 |
| 2015/0220737 A1* | 8/2015 | Rothman | G06F 21/6281 |
| | | | 726/1 |
| 2015/0277986 A1* | 10/2015 | Zhang | G06F 9/5077 |
| | | | 713/2 |
| 2015/0293857 A1* | 10/2015 | Cope | G06F 21/602 |
| | | | 713/193 |
| 2016/0070554 A1* | 3/2016 | Lewis | G06F 8/654 |
| | | | 713/2 |
| 2016/0277425 A1* | 9/2016 | Gasparakis | H04L 9/32 |
| 2016/0328300 A1* | 11/2016 | Rahardjo | G06F 11/1469 |
| 2017/0010875 A1* | 1/2017 | Martinez | G06F 21/575 |
| 2017/0085383 A1* | 3/2017 | Rao | G06F 8/654 |
| 2017/0097830 A1* | 4/2017 | Ehrenberg | G06F 9/4406 |
| 2017/0201380 A1* | 7/2017 | Schaap | H04L 63/083 |
| 2017/0235928 A1* | 8/2017 | Desai | G06F 9/4401 |
| | | | 713/2 |
| 2017/0372058 A1* | 12/2017 | Kulkarni | G06F 21/629 |
| 2018/0314846 A1* | 11/2018 | Schultz | G06F 9/45558 |
| 2019/0108347 A1* | 4/2019 | Ghetie | G06F 9/22 |
| 2019/0332775 A1* | 10/2019 | Savage | H04L 9/321 |
| 2019/0354685 A1* | 11/2019 | Tomasso | H04W 88/14 |
| 2020/0089487 A1* | 3/2020 | Ramic | G06F 8/65 |
| 2020/0210203 A1* | 7/2020 | Madala | G06F 9/4406 |
| 2020/0241747 A1* | 7/2020 | Gupta | G06F 3/0622 |
| 2021/0019418 A1* | 1/2021 | Peeters | G06F 21/572 |
| 2021/0084116 A1* | 3/2021 | Rajagopalan | G06F 8/65 |
| 2021/0090017 A1* | 3/2021 | Reiss | G06Q 10/0833 |

OTHER PUBLICATIONS

Lochter, Manfred, and Johannes Merkle. *Elliptic curve cryptography (ECC) brainpool standard curves and curve generation*. No. RFC 5639. 2010; 27 pages.

Brown, David R. L. "SEC 2: Recommended Elliptic Curve Domain Parameters." Certicom Research, Version 2.0, Jan. 27, 2010; 37 pages.

Gallagher, Patrick. "Digital signature standard (DSS)." *Federal Information Processing Standards Publications*, vol. FIPS (2013); 130 pages.

Bruce, Schneier. "Applied cryptography; protocols, algorithms, and source code in C." *New York: Wiley* (1996); 662 pages.

* cited by examiner

METHOD TO SECURELY ALLOW A CUSTOMER TO INSTALL AND BOOT THEIR OWN FIRMWARE, WITHOUT COMPROMISING SECURE BOOT

BACKGROUND

Field of the Disclosure

This disclosure relates generally to information handling systems and, more particularly, to a method to securely allow a customer to install and boot their own firmware, without compromising secure boot.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed baseboard management controller (BMC) may include a central processing unit (CPU) including a unique hidden root key (HRK) associated with the BMC and a non-volatile storage. The non-volatile storage may include BMC partitions and a customer firmware partition, the BMC partitions comprising a non-volatile storage partition, a non-volatile storage boot block partition, a BMC firmware partition, and a recovery partition. The BMC may also include a customer firmware image stored via the customer firmware partition. The customer firmware image may include a customer firmware and a signed customer boot block file. The signed customer boot block file may include a customer boot block, a HRK hash of the customer boot block based on the unique HRK, and a manufacturer signature utilized to sign the customer boot block and the HRK hash. The BMC may further include a BMC firmware stored via the BMC firmware partition. The BMC firmware may, when an alternate path to boot the customer boot block is detected, verify the manufacturer signature on the customer boot block and the HRK hash of the customer boot block. The BMC firmware may also, when the manufacturer signature has been verified, verify the HRK hash of the customer boot block based on the unique HRK, and when the HRK hash has been verified, hardware lock, at a non-volatile storage boot block partition level, the BMC partitions of the non-volatile storage, disable the HRK, and when the BMC partitions have been hardware locked and the HRK has been disabled, transfer control to the customer boot block.

In a number of the disclosed embodiments of the BMC, the customer boot block may further include a set of public keys. The customer boot block may verify each subsequent stage of the customer firmware based on a corresponding public key of the set public keys prior to executing the subsequent stage of the customer firmware.

In a number of the disclosed embodiments of the BMC, the unique HRK associated with the BMC may prevent the customer firmware image from being used to load on any other BMC.

In a number of the disclosed embodiments of the BMC, the HRK may comprise a symmetric advanced encryption standard (AES) cryptographic key based on one-time programmable (OTP) fuse bits fused in a first configuration. During a re-manufacturing of the BMC, one or more additional OTP fuse bits may be fused in a second configuration to cause the verification of the HRK hash of the customer boot block based on the OTP fuse bits fused in the first configuration to fail.

In a number of the disclosed embodiments of the BMC, the unique HRK associated with the BMC may prevent the customer boot block and the HRK hash of the customer boot block from working on any other BMC.

In a number of the disclosed embodiments of the BMC, the BMC may also include firmware update code. The firmware update code may, prior to the customer firmware image being stored via the customer firmware partition, receive the customer firmware image uploaded to the BMC and write the customer firmware image only to the customer firmware partition to prevent the BMC partitions from being overwritten. The customer firmware image may be written as a file and used as a chain load from the BMC firmware.

In a number of the disclosed embodiments of the BMC, prior to the customer firmware image being stored via the customer firmware partition, a customer authorization process may have been utilized to verify that a customer associated with the customer boot block file is authorized to run customer firmware on the BMC based on customer authorization information, a customer identification (ID) associated with the customer, and a BMC ID associated with the BMC, and when the customer is authorized to run customer firmware on the BMC, sign the customer boot block file using the manufacturer signature.

In a number of the disclosed embodiments of the BMC, the BMC firmware may also, when at least one of the verification of the manufacturer signature may have failed and the verification of the HRK hash may have failed, utilize a normal path to boot to a normal firmware image. The normal firmware image may include a manufacturer firmware image. The normal firmware image may include normal firmware and a signed normal boot block file. The normal boot block file may comprise a normal boot block.

In a second embodiment, a disclosed baseboard management controller (BMC) firmware verification system may include a manufacturer system and a BMC. The BMC may include a central processing unit (CPU) including a unique hidden root key (HRK) associated with the BMC and a non-volatile storage including BMC partitions and a customer firmware partition. The BMC partitions may include a non-volatile storage partition, a non-volatile storage boot block partition, a BMC firmware partition, and a recovery partition. The BMC may also include a customer firmware image stored via the customer firmware partition. The customer firmware image may include a customer firmware and a signed customer boot block file. The signed customer boot block file may include a customer boot block, a HRK hash of the customer boot block based on the unique HRK, and a manufacturer signature utilized to sign the customer boot block and the HRK hash. The BMC may further include a BMC firmware stored via the BMC firmware partition. The BMC firmware may, when an alternate path to boot the customer boot block is detected, verify the manufacturer signature on the customer boot block and the HRK hash of the customer boot block. The BMC firmware may also, when the manufacturer signature has been verified, verify the HRK hash of the customer boot block based on the unique HRK, and when the HRK hash has been verified, hardware lock, at a non-volatile storage boot block partition level, the BMC partitions of the non-volatile storage, disable the HRK, and when the BMC partitions may have been hardware locked and the HRK may have been disabled, transfer control to the customer boot block.

In a number of the disclosed embodiments of the BMC firmware verification system, the customer boot block may further include a set of public keys. The customer boot block may verify each subsequent stage of the customer firmware based on a corresponding public key of the set public keys prior to executing the subsequent stage of the customer firmware.

In a number of the disclosed embodiments of the BMC firmware verification system, the unique HRK associated with the BMC may prevent the customer firmware image from being used to load on any other BMC.

In a number of the disclosed embodiments of the BMC firmware verification system, the HRK may comprise a symmetric advanced encryption standard (AES) cryptographic key based on one-time programmable (OTP) fuse bits fused in a first configuration. During a re-manufacturing of the BMC, one or more additional OTP fuse bits may be fused in a second configuration to cause the verification of the HRK hash of the customer boot block based on the OTP fuse bits fused in the first configuration to fail.

In a number of the disclosed embodiments of the BMC firmware verification system, the unique HRK associated with the BMC may prevent the customer boot block and the HRK hash of the customer boot block from working on any other BMC.

In a number of the disclosed embodiments of the BMC firmware verification system, the BMC further may also include firmware update code. The firmware update code may, prior to the customer firmware image being stored via the customer firmware partition, receive the customer firmware image uploaded to the BMC and write the customer firmware image only to the customer firmware partition that may prevent the BMC partitions from being overwritten. The customer firmware image may be written as a file and used as a chain load from the BMC firmware.

In one or more embodiments, the BMC may generate the HRK hash. In a number of the disclosed embodiments of the BMC firmware verification system, the manufacturer system may also include a memory, a CPU, customer authorization information stored via the memory, and a customer authorization process stored via the memory and executable by the CPU of the manufacturer system. Prior to the customer firmware image being stored via the customer firmware partition, the customer authorization process may receive the customer boot block file, the HRK hash generated by the BMC, a customer identification (ID) associated with a customer and a BMC ID associated with the BMC from a customer system, verify that the customer is authorized to run customer firmware on the BMC based on customer authorization information, the customer ID, and the BMC ID, and when the customer is authorized to run customer firmware on the BMC, sign the customer boot block file and the HRK hash using the manufacturer signature and send the signed customer boot block file to the customer system.

In a number of the disclosed embodiments of the BMC firmware verification system, when at least one of the verification of the manufacturer signature may have failed and the verification of the HRK hash may have failed, the BMC firmware may utilize a normal path to boot to a normal firmware image. The normal firmware image may include a manufacturer firmware image. The normal firmware image may include normal firmware and a signed normal boot block file. The normal boot block file may comprise a normal boot block.

In a third embodiment, a disclosed method may include, verifying, by a BMC firmware, a manufacturer signature on a customer boot block of a signed customer boot block file and a hidden root key (HRK) hash of the customer boot block, when an alternate path to boot the customer boot block is detected. The BMC firmware may be stored via a BMC firmware partition of BMC partitions of a non-volatile storage of a baseboard management controller (BMC). The signed customer boot block file in a customer firmware image may be stored via a customer firmware partition of the non-volatile storage. The customer firmware image may further comprise a customer firmware. The HRK hash of the customer boot block may be based on a unique HRK of a central processing unit (CPU) of the BMC. The signed customer boot block file may further comprise the HRK hash of the customer boot block and the manufacturer signature utilized to sign the customer boot block and the HRK hash. The BMC partitions may further comprise a non-volatile storage partition, a non-volatile storage boot block partition, and a recovery partition. The method may also include, when the manufacturer signature has been verified, verifying, by the BMC firmware, the HRK hash of the customer boot block based on the unique HRK. The method may further include, when the HRK hash has been verified, hardware locking, by the BMC firmware at a non-volatile storage boot block partition level, the BMC partitions of the non-volatile storage. The method may also include, disabling, by the BMC firmware, the HRK. The method may further include, when the BMC partitions may have been hardware locked and the HRK may have been disabled, transferring, by the BMC firmware, control to the customer boot block.

In a number of the disclosed embodiments of the method, the customer boot block may further include a set of public keys. The method may also include verifying, by the customer boot block, each subsequent stage of the customer firmware based on a corresponding public key of the set public keys prior to executing the subsequent stage of the customer firmware.

In a number of the disclosed embodiments of the method, the HRK may comprise a symmetric advanced encryption standard (AES) cryptographic key based on one-time programmable (OTP) fuse bits fused in a first configuration. The method may also include, during a re-manufacturing of the BMC, fusing one or more additional OTP fuse bits in a second configuration that may cause the verification of the HRK hash of the customer boot block based on the OTP fuse bits fused in the first configuration to fail.

In a number of the disclosed embodiments of the method, the unique HRK associated with the BMC may prevent the customer boot block and the HRK hash of the customer boot block from working on any other BMC.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1, 2, 3, and 4 wherein like numbers are used to indicate like and corresponding parts.

Figure 1:
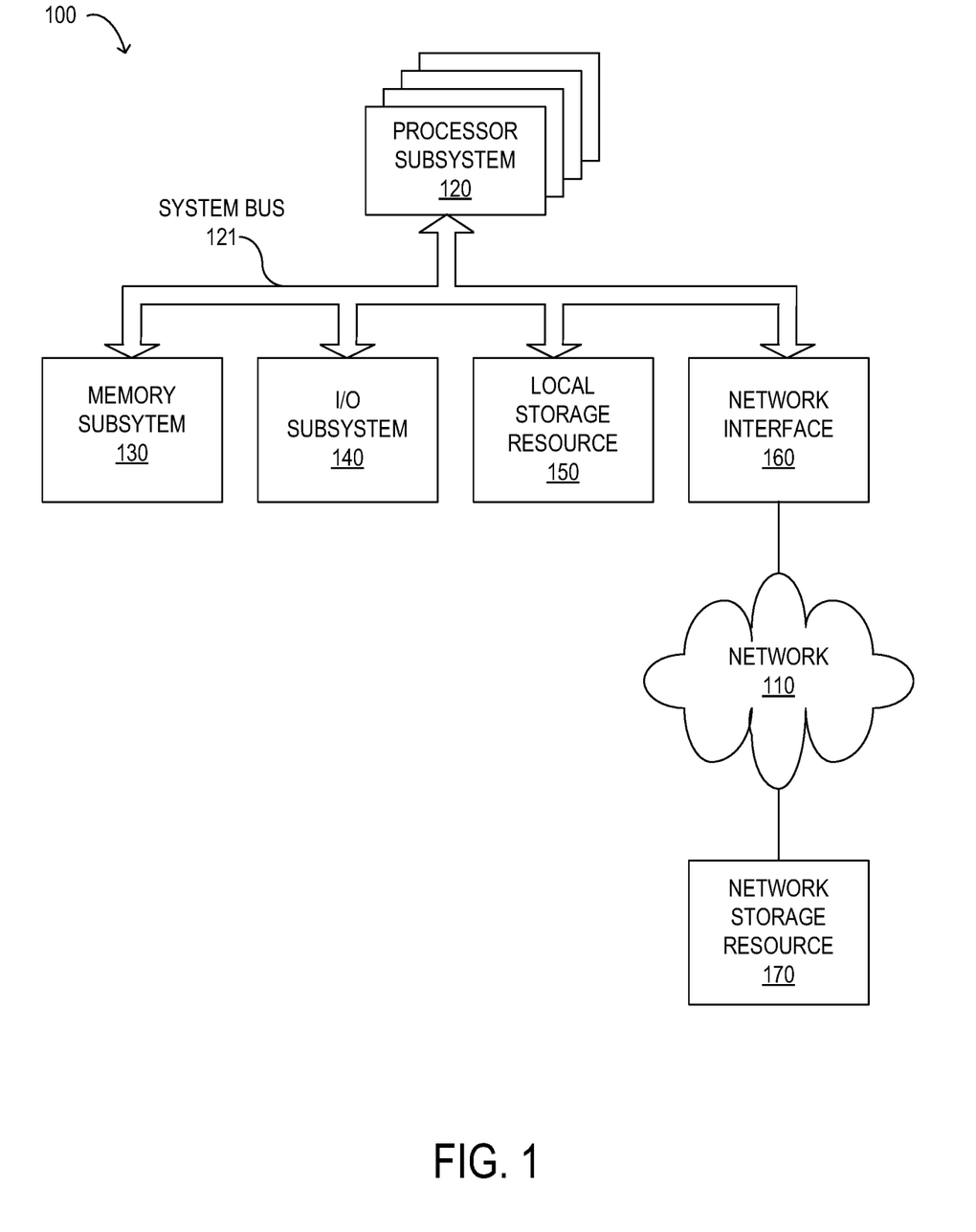
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

In order to provide a secure boot environment, baseboard management controllers (BMCs) provide hardware based secure boot environments that only allow trusted manufacturer-signed code to execute on these systems. This prevents malicious code from modifying the contents of flash memory. However, these secure boot environments also prevent customers from building and flashing their own firmware on these BMCs. There are many issues that need to be addressed in order to allow customer firmware to be run on a BMC in a secure trusted boot environment while maintaining or improving security. For example, the customer firmware to be flashed and run on the customer owned BMCs should not be allowed to run on any other BMC not owned by the customer. The manufacturer providing the trusted secure environment would need to control which BMCs can run which specific customer firmware, publish a list of which specific BMC have been enabled for running customer firmware, provide a complete hardware-rooted chain of trust to the customer with the same code verification guarantees that the manufacturer has, provide an environment that will not allow the customer firmware code to overwrite, tamper with, or perform any other malicious action with the manufacturer code on the BMC, and provide the ability to boot to a normal manufacturer-signed BMC image at any time. The trusted secure boot environment also needs to prevent previous customer images from running on a re-manufactured BMC.

As will be described in further detail herein, the inventors of the present disclosure have discovered systems and methods to securely allow a customer to install and boot their own firmware, without compromising secure boot. In the present solution, double verification of embedded code by both the customer and the manufacturer is provided using two layers of symmetric and asymmetric signature verification. This solution provides the manufacturer with control over which servers are allowed to flash and boot non-manufacturer firmware, requires assent from the customer before running code, ensuring that customer's BMCs are always running the code that the customer intended. This solution further extends Secure Boot to the customers firmware, providing a secure handoff between manufacturer firmware and customer firmware, meaning a customer knows that all code executed on the BMC is either from the manufacturer or their own code. This solution also allows a customer to only boot either their trusted code or the manufacturers trusted code, maintains supply chain integrity, e.g., a desolder attack cannot be conducted, enables the manufacturer to do internal development x-rev releases securely. Typically, x-rev releases represent a security problem because if they are leaked to the field they can cause security issues. The solution provides verification from the manufacturer that the BMC is allowed to run customer code. Particular customers are allowed to unlock specific individual BMCs to run that customer's code. This solution provides the customer with the ability to cryptographically verify that the BMC is running their signed code with the same hardware root of trust guarantees that the manufacturer code has. This solution ensures that an attacker, even with physical access, cannot write untrusted code to the BMC to run. This solution also provides repudiations by publishing the list of systems that have granted keys to run customer code, which give the customer the ability to check their systems against this list to see if they are possibly running untrusted code. If their system isn't on the list, then the system has manufacturer signed and trusted code on the flash.

Figure 2:
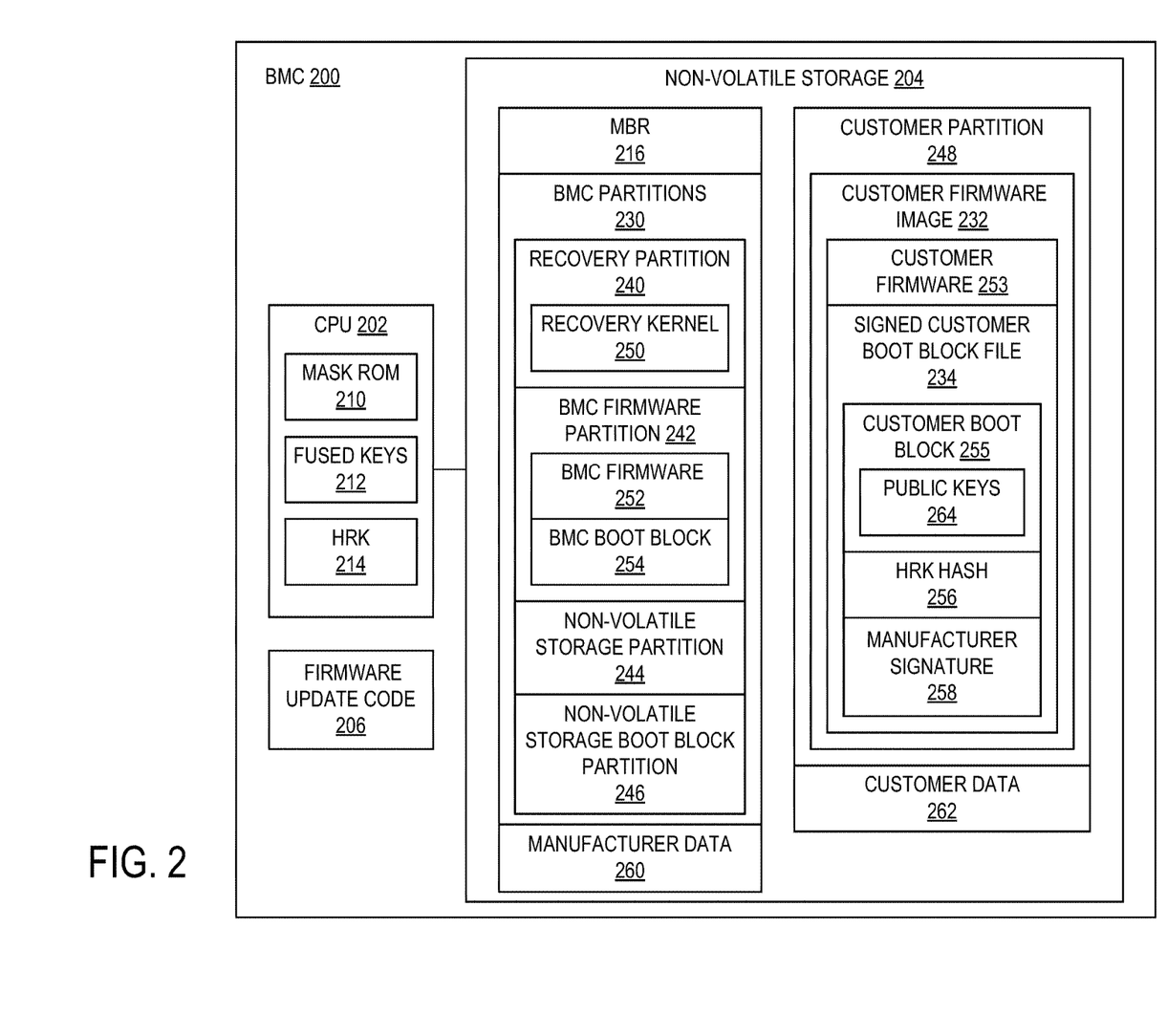
FIG. 2 is a block diagram of selected elements of an embodiment of an exemplary baseboard management controller (BMC)

Turning now to FIG. 2, a block diagram depicting selected elements of an embodiment of an exemplary baseboard management controller (BMC) 200 for securely allowing a customer to install and boot their own firmware, without compromising secure boot. BMC 200 may be structurally and functionally similar to information handling system 100, previously described with reference to FIG. 1. As shown in FIG. 2, components of BMC 200 may include, but are not limited to, a CPU 202, a non-volatile storage 204, and firmware update code 206. In one or more embodiments, non-volatile storage 204 may include a non-volatile memory medium. For example, the non-volatile memory medium may include a flash memory. For instance, the flash memory may include a serial peripheral interface (SPI) flash memory. CPU 202 may include a mask ROM 210, fused keys 212, and a unique hidden root key (HRK) 214.

Non-volatile storage 204 may include a master boot record (MBR) 216, BMC partitions 230, customer partition 248, manufacturer data 260, and customer data 262. BMC partitions 230 may include a recovery partition 240, a BMC firmware partition 242, a non-volatile storage partition 244, and a non-volatile storage boot block partition 246. In one or more embodiments, non-volatile storage partition 244 may include a non-volatile memory medium partition. For example, the non-volatile memory medium partition may include a SPI flash partition. In one or more embodiments, non-volatile storage boot block partition 246 may include a non-volatile memory medium storage boot block partition. For example, the non-volatile memory medium storage boot block partition may include a flash boot block partition. For instance, the flash boot block partition may include an embedded multi-media card (EMMC) flash boot block partition. Recovery partition 240 may include recovery kernel 250. BMC firmware partition 242 may include BMC firmware 252 and a BMC boot block 254. Customer partition 248 may include a customer firmware image 232. Customer firmware image 232 may include customer firmware 253 and a signed customer boot block file 234. Customer firmware 253 may include a set of public keys 264. Signed customer boot block file 234 may include customer boot block 255, an HRK hash 256 of customer boot block 255 based on unique HRK 214, and a manufacturer signature 258 utilized to sign customer boot block 255 and HRK hash 256.

In one or more embodiments, determining HRK hash 256 of customer boot block 255 may include utilizing a one-way hash function of the at least the portion of customer boot block 255. In one example, a one-way hash function may be relatively easy to compute. For instance, for a value x (e.g., a number, a string, binary data, etc.) and a one-way hash function h, h(x) may be relatively easy to compute. In another example, a one-way hash function may significantly difficult to reverse. For instance, for the one-way hash function h and a value h(z), z may be significantly difficult to compute. In one or more embodiments, significantly difficult to compute may mean that it may take years to compute z from h(z), even if multiple computers were applied to such a task. In one or more embodiments, a one-way hash function may be considered collision free. For example, the one-way hash function may be injective or one-to-one. For instance, $h(z_1)$ and $h(z_2)$ may produce different values, where $z_1$ and $z_2$ are different. In one or more embodiments, a one-way hash function may be considered a cryptographic checksum, a message digest, a digital fingerprint, a message integrity check, a contraction function, a compression function, and/or a manipulation detection code, among others. Examples of one-way hash functions may include one or more of an Abreast Davies-Meyer, a Davies-Meyer, a message digest (MD) 2, a MD 4, a MD 5, a RIPE-MD, a GOST Hash, a N-HASH, a HAVAL, a SHA (secure hash algorithm) (e.g., SHA-1, SHA-2, SHA-3, SHA-224, SHA-256, SHA-384, SHA-512, SHA-512/224, SHA-512/256, etc.), and a SNEFRU, among others. In one or more embodiments, a one-way hash function may be a composite function of two or more one-way hash functions. For example, a function $h_1$ may include a MD 5 one-way hash function $h_2$, a SHA one-way hash function $h_3$, and a MD 5 one-way hash function $h_4$, such that $h_1=h_2(h_3(h_4(z)))$. For instance, a one-way hash function that is a composite function of two or more one-way hash functions may be considered to be and/or said to be strengthened. In one or more embodiments, a cryptographic hash function may be or include a one-way hash function.

Fused keys 212 may comprise one-time programmable (OTP) fuse bits. Unique HRK 214 may comprise a symmetric advanced encryption standard (AES) cryptographic key based on fused keys 212 that are fused within CPU 202 in an initial configuration. Unique HRK 214 is not accessible to code running on CPU 202, but can be used for encryption of data and digital signature encryption. Unique HRK 214 may also be disabled. During a re-manufacturing of BMC 200, one or more additional OTP fuse bits of fused keys 212 of CPU 202 may be fused in re-manufactured configuration. Since the initial configure of fused keys 212 is now different than the re-manufactured configuration of fused keys 212, the verification of HRK hash 256 of customer boot block 255 based on the initial configuration fused keys 212 to fail. This prevents an older customer firmware image 232 from running on BMC 200.

A boot block 254 such as BMC boot block 254 may comprise a custom bootloader that will execute an associated firmware 252, which is BMC firmware 252 in this case. The custom bootloader may by a universal boot (U-Boot). U-Boot functions may include basic system initialization, bootstrapping the system, and various other functions. Customer boot block 255 stored via customer partition 248 is a customer boot block. Customer boot block 255 is under control of the customer and may utilize public keys 264 within customer boot block 255 to verify each subsequent stage of customer firmware 253 prior to executing each stage.

During boot-time operation of BMC 200, BMC boot block 254 may initiate execution of BMC firmware 252. BMC firmware 252 may detect an alternate boot path to customer boot block 255 of customer firmware image 232. BMC firmware 252 may perform two layers of symmetric and asymmetric signature verification to ensure that customer boot block 255 of customer firmware image 232 is authorized to run on BMC 200 and has not been altered or tampered with in a malicious way. When the alternate boot path is detected, BMC firmware 252 may verify manufacturer signature 258 on the entire chain-load customer boot block 255 and HRK hash 256 of customer boot block 255. BMC firmware 252 may also, when manufacturer signature 258 has been verified, verify HRK hash 256 of customer boot block 255 based on unique HRK 214. When HRK hash 256 has been verified, BMC firmware 252 may hardware lock, at a non-volatile storage boot block partition level, BMC partitions 230 of non-volatile storage 204 and disable HRK 214. When BMC partitions 230 have been hardware locked and HRK 214 has been disabled, BMC firmware 252 may transfer control to customer boot block 255.

During execution of customer boot block 255, customer boot block 255 may verify each subsequent stage of customer boot block 255 based on a corresponding public key of the set of public keys 264 prior to executing the subsequent stage of customer firmware 253.

Unique HRK 214 associated with BMC 200 is unique to BMC 200 and will be different than another unique HRK 214 associated with another BMC 200. The uniqueness of unique HRK 214 may prevent customer firmware image 232 from being used to load on any other BMC. Unique HRK 214 may also prevent customer boot block 255 and HRK hash 256 customer boot block 255 from working on any other BMC.

When at least one of the verification of manufacturer signature 258 may have failed and the verification of HRK hash 214 may have failed, BMC firmware 252 may utilize a normal path to boot to recovery kernel 250 stored via recovery partition 240. Recovery kernel 250 may include a normal firmware 252 and a signed normal boot block file 234. Normal boot block file 254 may comprise a normal boot block 254.

Prior to customer firmware image 232 being stored via customer partition 248, firmware update code 206 may receive customer firmware image 232 uploaded to BMC 200. Firmware update code 206 may write customer firmware image 232 only to customer partition 248 to prevent BMC partitions 230 from being overwritten. Customer firmware image 232 may be written as a file and used as a chain load from BMC firmware 252.

Prior to customer firmware image 232 being stored via customer partition 248, a customer authorization process may have been utilized to verify that a customer associated with boot block file 234 is authorized to run customer firmware 253 on BMC 200 based on customer authorization information, a customer identification (ID) associated with the customer, and a BMC ID associated with BMC 200. When the customer has been authorized to run customer firmware 253 on BMC 200, the customer authorization process may sign boot block file 234 using manufacturer signature 258.

Figure 3:
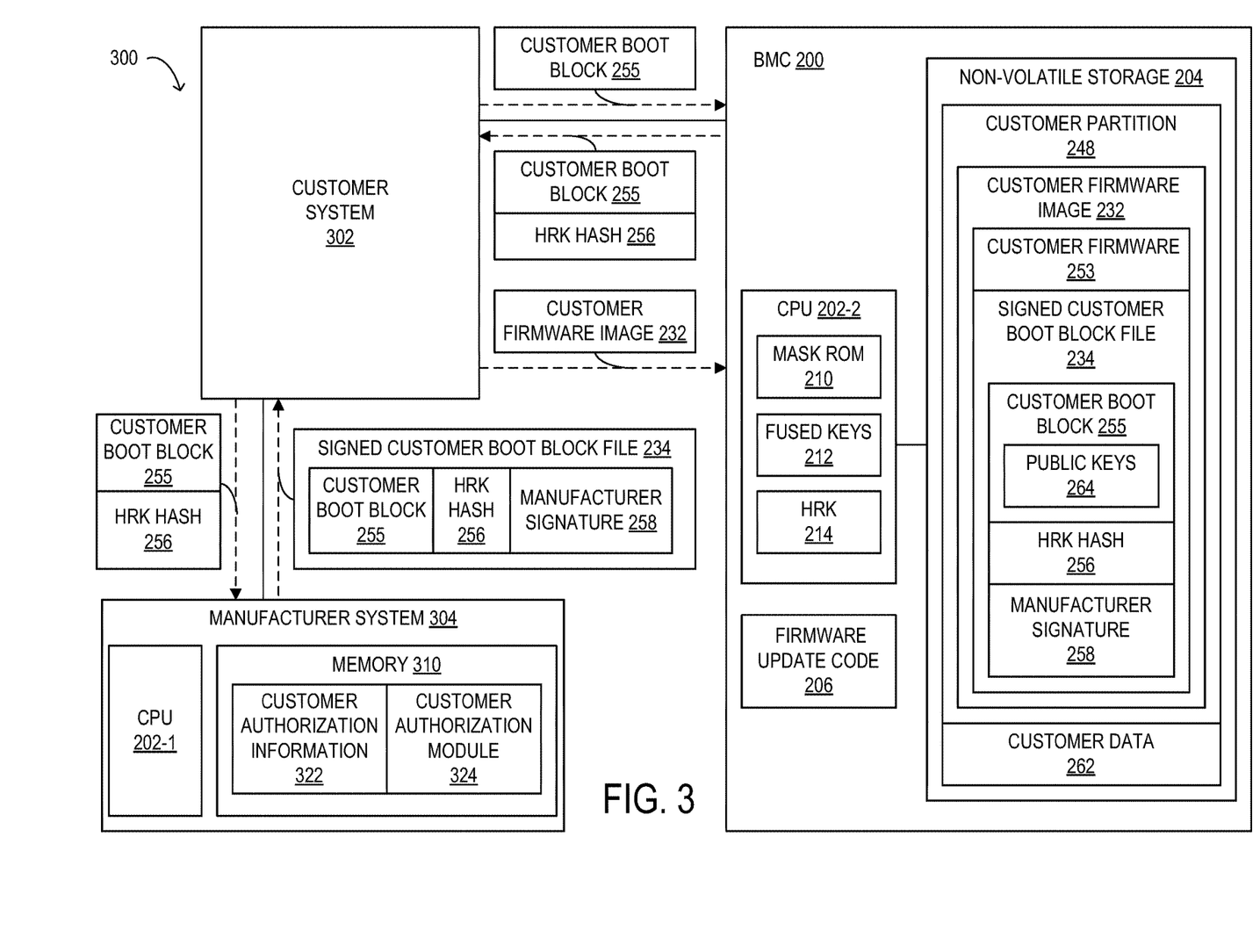
FIG. 3 is a block diagram of selected elements of an embodiment of an exemplary BMC firmware verification system.

Turning now to FIG. 3, a block diagram of selected elements of an embodiment of an exemplary BMC firmware verification system 300 is illustrated. As shown in FIG. 3, components of BMC firmware verification system 300 may include, but are not limited to, a customer system 302, a manufacturer system 304, and BMC 200, described above with reference to FIG. 2. Manufacturer system 304 may include a CPU 202-1, a memory 310, customer authorization information 322 stored via memory 310, and a customer authorization module 324 stored via memory 310 and executable by CPU 202-1 of manufacturing system 304.

During operation, a customer may develop a customer boot block 255 and customer firmware 253 to run on BMC 200. The customer may embed public keys 264 within customer boot block 255 and utilize each of public key 256s to encrypt and/or digitally sign each stage of customer firmware 253 to provide a layer of customer security. Customer system 302 may then provide customer boot block 255 to BMC 200. Customer boot block 255 may be provided to BMC 200 by secure transmission of customer boot block 255 or a secure uploaded of customer boot block 255 to BMC 200. BMC 200 may receive customer boot block 255. BMC 200 may generate a cryptographic HRK hash 256 of customer boot block 255 based on HRK 214. BMC 200 may then provide a customer boot block 255 and HRK hash 256 file back to customer system 302. Customer system 302 may receive the customer boot block 255 and HRK hash 256 file from BMC 200. Customer system 302 may provide the customer boot block 255 and HRK hash 256 file, a customer identification (ID) associated with the customer, and a BMC ID associated with BMC 200 to manufacturer system 304.

Manufacturer system 304 may receive the customer boot block 255 and HRK hash 256 file, the customer ID, and the BMC ID from customer system 302. Customer authorization module 324 may perform a customer authorization process to verify that the customer is authorized to run customer firmware customer boot block 255 on BMC 200 based on customer authorization information 322, the customer ID, and the BMC ID. When the customer has been authorized to run customer boot block 255 on BMC 200, customer authorization module 324 may sign boot block file 234 using manufacturer signature 258 and log the fact that manufacturer system 304 has signed the customer's boot block file 234 to a list of BMCs 200 that have granted keys to run customer code, which enables manufacturer system 304 to publish the list of BMCs 200 that have granted keys to run customer code for customer access. Customer authorization module 324 may send signed customer boot block file 234 to customer system 302. Customer system 302 may combine firmware 232 with signed customer boot block file 234 to produce customer firmware image 232. Because customer firmware image 232 includes HRK hash 256, customer firmware image 232 is tied to one specific BMC, BMC 200. As such, customer firmware image 232 cannot be used to load or flash on any other BMC 200. Customer system 302 then provides customer firmware image 232 to BMC 200 utilizing the normal firmware update mechanism. Firmware update code 206 writes customer firmware image 232 to customer partition 248 of non-volatile storage 204. Firmware update code 206 will write only to customer partition 248 such that BMC partitions 230 or other data is not overwritten. Customer boot block 255 is written as a file to customer partition 248 and used as a chain load from BMC firmware 252. Firmware update code 206 may perform other functions to set up to boot to customer boot block 255. At this point, operation of BMC 200 is the same as previously described with reference to FIG. 2.

Figure 4:
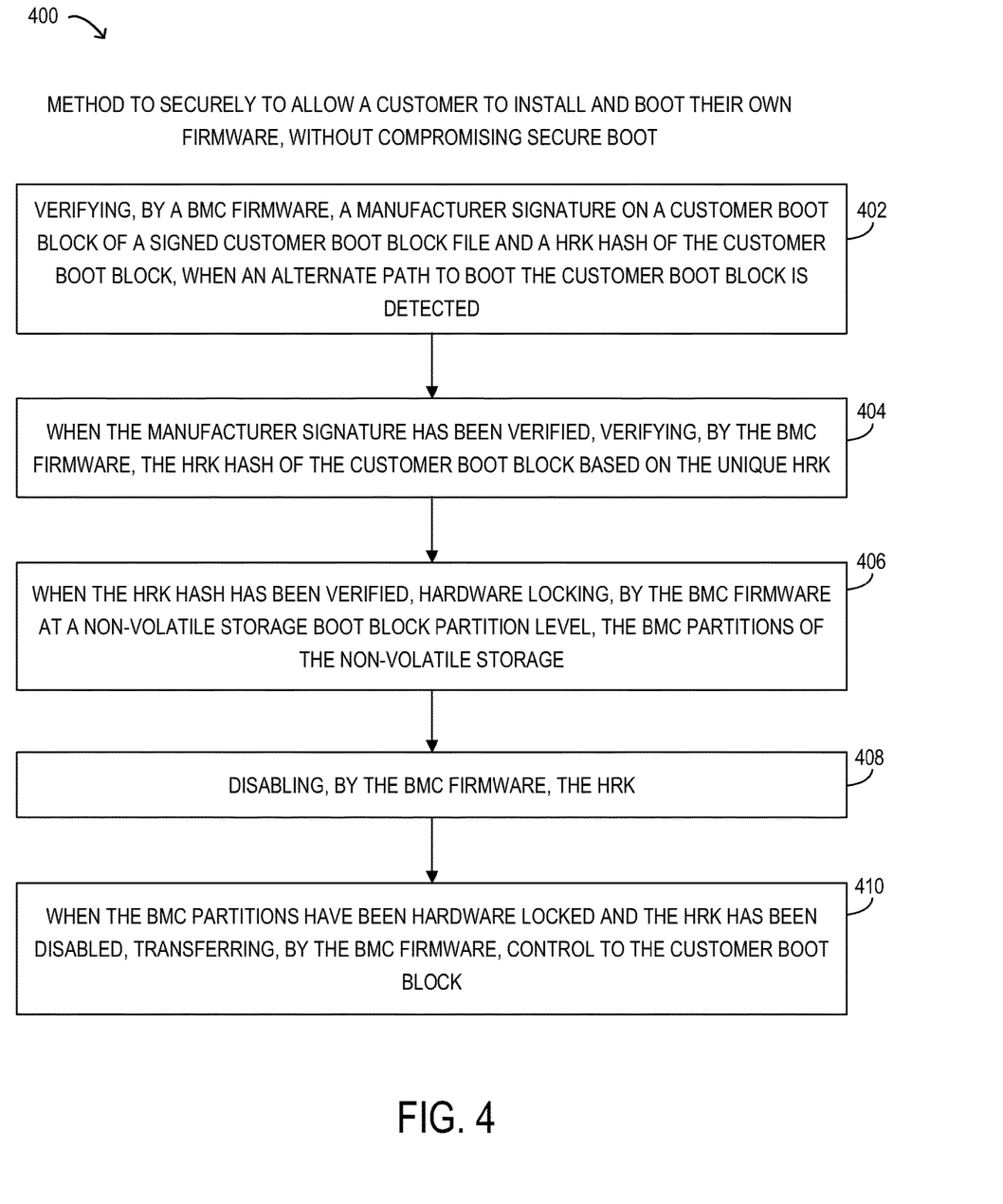
FIG. 4 is a flowchart depicting selected elements of an embodiment of a method to securely allow a customer to install and boot their own firmware, without compromising secure boot.

FIG. 4 is a flowchart depicting selected elements of an embodiment of a method 400 to securely allow a customer to install and boot their own firmware, without compromising secure boot. At least a portion of method 400 may be performed by information handling system 100, BMC 200, BMC firmware verification system 300, previously described with reference to FIGS. 1, 2 and 3, or another information handling system. It is noted that certain operations described in method 400 may be optional or may be rearranged in different embodiments.

Method 400 may begin at step 402, by verifying, by a BMC firmware, a manufacturer signature on a customer boot block of a signed customer boot block file and a HRK hash of the customer boot block, when an alternate path to boot the customer boot block is detected. The BMC firmware may be stored via a BMC firmware partition of BMC partitions of a non-volatile storage of a BMC. The signed customer boot block file in a customer firmware image may be stored via a customer firmware partition of the non-volatile storage. The customer firmware image may further comprise a customer firmware. The HRK hash of the customer boot block may be based on a unique HRK of a CPU of the BMC. The signed customer boot block file may further comprise the HRK hash of the customer boot block and the manufacturer signature utilized to sign the customer boot block and the HRK hash. The BMC partitions may further comprise a non-volatile storage partition, a non-volatile storage boot block partition, and a recovery partition. At step 404, when the manufacturer signature has been verified, verifying, by the BMC firmware, the HRK hash of the customer boot block based on the unique HRK. At step 406, when the HRK hash has been verified, hardware locking, by the BMC firmware at a non-volatile storage boot block partition level, the BMC partitions of the non-volatile storage. At step 408, disabling, by the BMC firmware, the HRK. At step 410, when the BMC partitions may have been hardware locked and the HRK may have been disabled, transferring, by the BMC firmware, control to the customer boot block.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A baseboard management controller (BMC), comprising:
   a central processing unit (CPU) including a unique hidden root key (HRK) associated with the BMC;
   a non-volatile storage including BMC partitions and a customer firmware partition, the BMC partitions including a non-volatile storage partition, a non-volatile storage boot block partition, a BMC firmware partition, and a recovery partition;
   a customer firmware image stored via the customer firmware partition, the customer firmware image including a customer firmware and a signed customer boot block file, the signed customer boot block file including a customer boot block, a HRK hash of the customer boot block based on the unique HRK, and a manufacturer signature utilized to sign the customer boot block and the HRK hash; and
   a BMC firmware stored via the BMC firmware partition, which when executed by the CPU, causes the BMC to:
      when an alternate path to boot the customer boot block is detected, verify the manufacturer signature on the customer boot block and the HRK hash of the customer boot block;
      when the manufacturer signature has been verified, verify the HRK hash of the customer boot block based on the unique HRK;
      when the manufacturer signature has been verified and when the HRK hash has been verified:
         hardware lock, at a non-volatile storage boot block partition level, the BMC partitions of the non-volatile storage;
         disable the HRK; and
      when the BMC partitions have been hardware locked and the HRK has been disabled, transfer control to the customer boot block.

2. The BMC of claim 1, wherein the customer boot block further includes a set of public keys, and wherein the customer boot block to:
   verify each subsequent stage of the customer firmware based on a corresponding public key of the set public keys prior to executing the subsequent stage of the customer firmware.

3. The BMC of claim 1,
   wherein the HRK includes a symmetric advanced encryption standard (AES) cryptographic key based on one-time programmable (OTP) fuse bits fused in a first configuration; and
   wherein, during a re-manufacturing of the BMC, one or more additional OTP fuse bits are fused in a second configuration to cause the verification of the HRK hash of the customer boot block based on the OTP fuse bits fused in the first configuration to fail.

4. The BMC of claim 1, wherein the unique HRK associated with the BMC prevents the customer boot block and the HRK hash of the customer boot block from working on another BMC.

5. The BMC of claim 1, the BMC further comprising:
   firmware update code to:
      prior to the customer firmware image being stored via the customer firmware partition:
         receive the customer firmware image uploaded to the BMC; and
         write the customer firmware image only to the customer firmware partition to prevent the BMC partitions from being overwritten, wherein the customer firmware image is written as a file and used as a chain load from the BMC firmware.

6. The BMC of claim 1, wherein, prior to the customer firmware image being stored via the customer firmware partition, a customer authorization process was utilized to:
   verify that a customer associated with the customer boot block file is authorized to run customer firmware on the BMC based on customer authorization information, a customer identification (ID) associated with the customer, and a BMC ID associated with the BMC; and
   when the customer is authorized to run customer firmware on the BMC:
      sign the customer boot block file using the manufacturer signature.

7. The BMC of claim 1, wherein, when at least one of the verification of the manufacturer signature has failed and the verification of the HRK hash has failed:
    utilize a normal path to boot to a normal firmware image, the normal firmware image including normal firmware and a signed normal boot block file, the normal boot block file including a normal boot block.

8. A baseboard management controller (BMC) firmware verification system, comprising:
    a manufacturer system; and
    a BMC including:
    a first central processing unit (CPU) including a unique hidden root key (HRK) associated with the BMC;
    a non-volatile storage including BMC partitions and a customer firmware partition, the BMC partitions comprising a non-volatile storage partition, a non-volatile storage boot block partition, a BMC firmware partition, and a recovery partition;
    a customer firmware image stored via the customer firmware partition, the customer firmware image including a customer firmware and a signed customer boot block file, the signed customer boot block file comprising a customer boot block, a HRK hash of the customer boot block based on the unique HRK, and a manufacturer signature utilized to sign the customer boot block and the HRK hash; and
    a BMC firmware stored via the BMC firmware partition, which when executed by the first CPU, causes the BMC to: when an alternate path to boot the customer boot block is detected, verify the manufacturer signature on the customer boot block and the HRK hash of the customer boot block;
    when the manufacturer signature has been verified, verify the HRK hash of the customer boot block based on the unique HRK;
    when the manufacturer signature has been verified and when the HRK hash has been verified:
        hardware lock, at a non-volatile storage boot block partition level, the BMC partitions of the non-volatile storage;
        disable the HRK; and
    when the BMC partitions have been hardware locked and the HRK has been disabled, transfer control to the customer boot block.

9. The BMC firmware verification system of claim 8, wherein the customer boot block further includes a set of public keys, and wherein the customer boot block to:
    verify each subsequent stage of the customer firmware based on a corresponding public key of the set public keys prior to executing the subsequent stage of the customer firmware.

10. The BMC firmware verification system of claim 8, wherein the HRK includes a symmetric advanced encryption standard (AES) cryptographic key based on one-time programmable (OTP) fuse bits fused in a first configuration; and
    wherein, during a re-manufacturing of the BMC, one or more additional OTP fuse bits are fused in a second configuration to cause the verification of the HRK hash of the customer boot block based on the OTP fuse bits fused in the first configuration to fail.

11. The BMC firmware verification system of claim 8, wherein the unique HRK associated with the BMC prevents the customer boot block and the HRK hash of the customer boot block from working on another BMC.

12. The BMC firmware verification system of claim 8, wherein the BMC further includes: firmware update code, which when executed by the first CPU, causes the BMC to:
    prior to the customer firmware image being stored via the customer firmware partition:
        receive the customer firmware image uploaded to the BMC; and
        write the customer firmware image only to the customer firmware partition to prevent the BMC partitions from being overwritten, wherein the customer firmware image is written as a file and used as a chain load from the BMC firmware.

13. The BMC firmware verification system of claim 8, wherein the BMC firmware further causes the BMC to generate the HRK hash;
    wherein the manufacturer system further comprises:
        a memory;
        a second CPU, different from the first CPU, coupled to the memory;
        customer authorization information stored via the memory; and
        a customer authorization process stored via the memory and executable by the second CPU; and
    wherein, prior to the customer firmware image being stored via the customer firmware partition, the customer authorization process causes the manufacturer system to:
        receive the customer boot block file, the HRK hash generated by the BMC, a customer identification (ID) associated with a customer, and a BMC ID associated with the BMC from a customer system;
        verify that the customer is authorized to run customer firmware on the BMC based on the customer authorization information, the customer ID, and the BMC ID; and
        when the customer is authorized to run customer firmware on the BMC:
            sign the customer boot block file and the HRK hash using the manufacturer signature; and
            send the signed customer boot block file and the HRK hash to the customer system.

14. The BMC firmware verification system of claim 8, wherein, when at least one of the verification of the manufacturer signature has failed and the verification of the HRK hash has failed:
    utilize a normal path to boot to a normal firmware image, the normal firmware image including normal firmware and a signed normal boot block file, the normal boot block file comprising a normal boot block.

15. A method, comprising:
    verifying, by a baseboard management controller (BMC) firmware, a manufacturer signature on a customer boot block of a signed customer boot block file and a hidden root key (HRK) hash of the customer boot block, when an alternate path to boot the customer boot block is detected,
    wherein the BMC firmware stored via a BMC firmware partition of BMC partitions of a non-volatile storage of a BMC,
    wherein the signed customer boot block file in a customer firmware image stored via a customer firmware partition of the non-volatile storage,
    wherein the customer firmware image further includes a customer firmware,
    wherein the HRK hash of the customer boot block is based on a unique HRK of central processing unit (CPU) of the BMC, wherein the signed customer boot block file further includes the HRK hash of the customer boot block and the manufacturer signature utilized to sign the customer boot block and the HRK hash, and wherein the BMC partitions further comprise a non-volatile storage partition, a non-volatile storage boot block partition, and a recovery partition; and when the manufacturer signature has been verified, verifying, by the BMC firmware, the HRK hash of the customer boot block based on the unique HRK;

when the HRK hash has been verified:
   hardware locking, by the BMC firmware at a non-volatile storage boot block partition level, the BMC partitions of the non-volatile storage;
   disabling, by the BMC firmware, the HRK; and when the BMC partitions have been hardware locked and the HRK has been disabled, transferring, by the BMC firmware, control to the customer boot block.

16. The method of claim 15, wherein the customer boot block further includes a set of public keys;
   the method further comprising:
      verifying, by the customer boot block, each subsequent stage of the customer firmware based on a corresponding public key of the set public keys prior to executing the subsequent stage of the customer firmware.

17. The method of claim 15, wherein the HRK comprises a symmetric advanced encryption standard (AES) cryptographic key based on one-time programmable (OTP) fuse bits fused in a first configuration;
   the method further comprising:
      during a re-manufacturing of the BMC, fusing one or more additional OTP fuse bits in a second configuration to cause the verification of the HRK hash of the customer boot block based on the OTP fuse bits fused in the first configuration to fail.

* * * * *